Jan. 5, 1937. F. M. SLOUGH 2,066,700
MEASURING MECHANISM
Filed Aug. 26, 1929 2 Sheets-Sheet 1
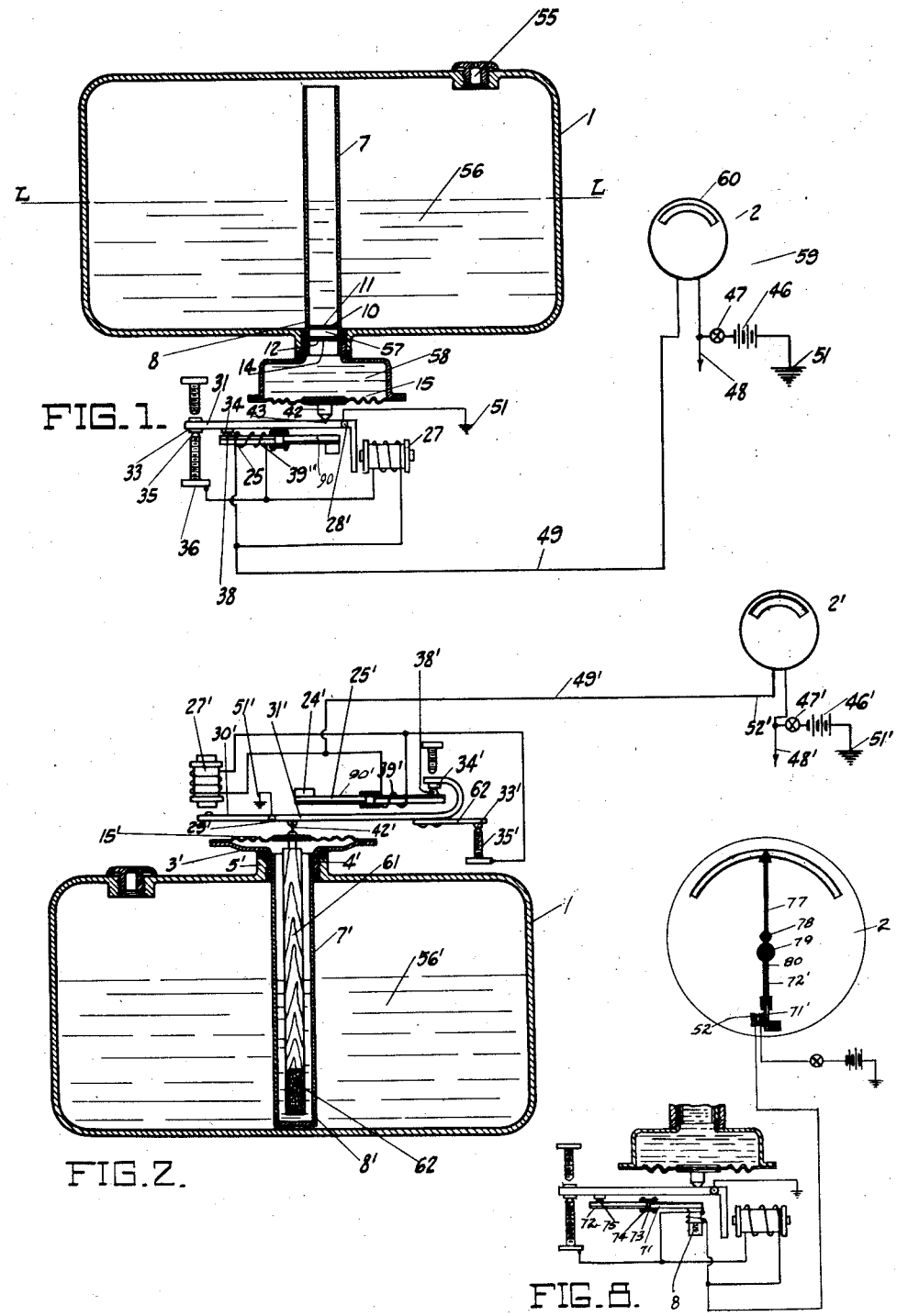

Jan. 5, 1937.  F. M. SLOUGH  2,066,700
MEASURING MECHANISM
Filed Aug. 26, 1929　　2 Sheets-Sheet 2
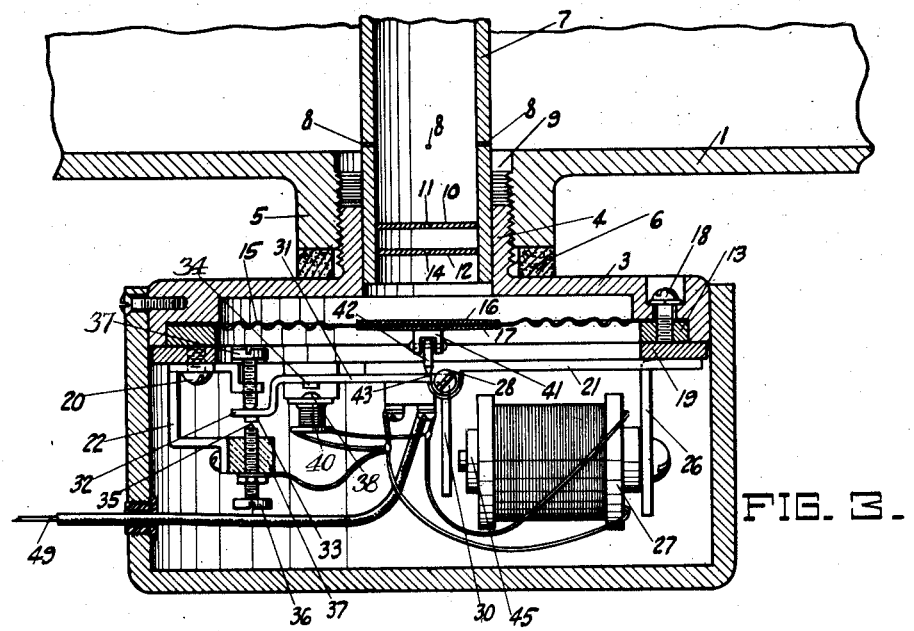
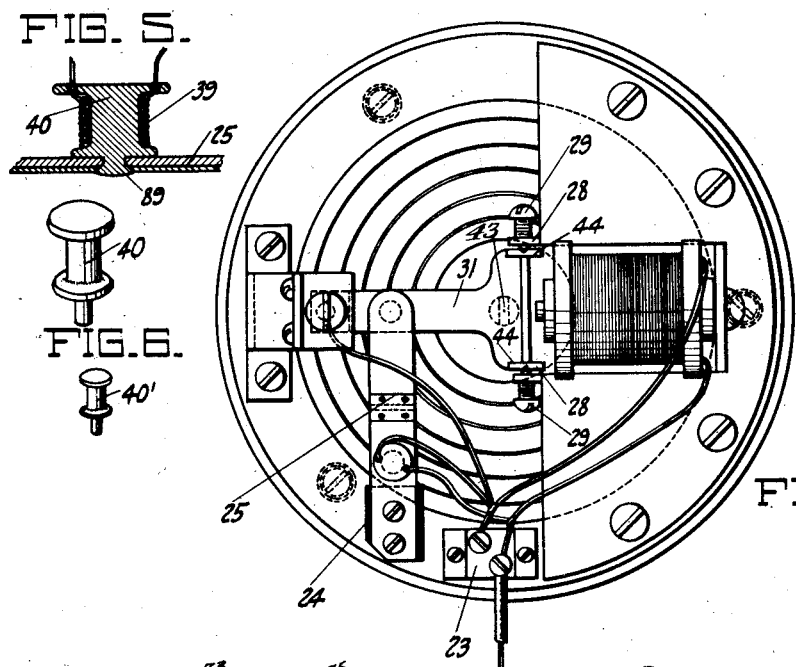
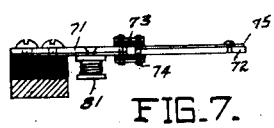
Inventor
Frank M. Slough.

Patented Jan. 5, 1937

2,066,700

UNITED STATES PATENT OFFICE 2,066,700

MEASURING MECHANISM

Frank M. Slough, Cleveland, Ohio

Application August 26, 1929, Serial No. 388,287

5 Claims. (Cl. 177—351)

My invention relates to pressure measuring systems, and relates particularly to pressure measuring systems adapted to remotely indicate a pressure exerted by a confined fluid.

An object of my invention is to provide an improved mechanism for remotely indicating the amount of liquid contained in a receptacle.

Another object of my invention is to indicate, remotely thereof, the amount of liquid contained in a receptacle.

Another object of my invention is to indicate, remotely thereof, a pressure exerted by a confined fluid.

Another object of my invention is to indicate, on the instrument board of an automotive vehicle, the amount of liquid supply carried by the vehicle for the operation of the engine thereof.

Another object of my invention is to reliably indicate on the instrument board of an automotive vehicle, the amount of liquid fuel contained in a fuel tank disposed remotely thereto.

Another object of my invention is to accomplish each and every of the aforesaid objects by electrical means.

Another object of my invention is to provide an improved means of electrically indicating, at a distance, the potential energy of a pressure, without the interposition of fluid pressure communicating conduits extending between the indicating and pressure elements of the system.

Other objects of my invention and the invention itself will become apparent by reference to the following description of certain embodiments of my invention, and which are illustrated in the accompanying drawings.

Referring to the drawings:—

Fig. 1 illustrates, largely diagrammatically, but comprising a sectional view of an automotive vehicle gasoline tank, an embodiment of my invention.

Fig. 2 illustrates, in similar view, a second embodiment of my invention.

Fig. 3 illustrates a controlling mechanism constructed in accordance with the embodiment of Fig. 1, applied to a receptacle such as a gasoline tank of an automotive vehicle, the view being in longitudinal medial section.

Fig. 4 is a plan view of the apparatus of Fig. 3.

Fig. 5 is a view of a heating element adapted to be employed in connection with any of the embodiments of my invention to support the heating winding.

Fig. 6 illustrates a pair of metallic spools for the element of Fig. 5, to carry out a purpose later described.

Figs. 7 and 8 illustrate other embodiment apparatus pertaining to my invention.

Referring now first to Figs. 1, 3, 4, 5 and 6, illustrating variously an embodiment of my invention, the invention is therein illustrated as being applied to the gasoline containing fuel tank 1 of an automotive vehicle having an instrument board disposed remotely to the tank 1, and including a gasoline gauge indicator 2. The indicator 2, and 2' in the embodiment of Figs. 1 and 2, will be understood to be preferably disposed forwardly in the driving compartment of the automobile, and the tank 1 and 1', respectively, may be placed on any part of the automobile desired, and in the following description will be understood to be supported on the chassis frame rearwardly of the passenger compartment, in the usual manner; also the tank 1 may be of any suitable form, such as rectangular, illustrated, or of any other form, such as cylindrical.

In the embodiment of Figs. 1 and 3, to the bottom of the tank 1, a flanged cup element 3 is secured, being secured in any suitable way such as by screw threading the hollow stem of the cup into an internally threaded boss flange 5, depending integrally from the tank 1 a fluid seal gasket being preferably interposed between the contiguous opposing surface of the flange and the cup to prevent loss of the liquid fuel, which otherwise might pass the screw threads.

Within the tubular stem 4, there is preferably rigidly carried, an upstanding tube 7, thereby projected, preferably vertically, within the tank 1, near its top wall, the tube being preferably opened at its top and comprising one or more small apertures 8 through its lateral walls near its bottom end, preferably flush with the bottom inner wall of the tank, but preferably substantially above an annular well 9 surrounding the tube 7, and provided for the reception of foreign particles of dust, dirt or the like, which may in any way be communicated to the interior of the tank 1.

The bottom end of the tube 7, below the apertures 8, is provided with one or more means for restraining the rapid communication of fluid between the spaces above and below such means. In the embodiment illustrated, the fluid flow restraining means are in the form of a pair of metallic discs 10 and 12, having minute orifices 11 and 14, adapted to communicate fluid pressures exerted on the one side of each disc, to the other side, but restraining the rate of charge of fluid pressures on its two sides.

Rigidly secured by its peripheral border by a metallic clamping ring 13, within the rim portion of the casing cup 3, there is provided a yieldable wall in the form of a diaphragm 15 adapted to support the column of liquid fuel disposed above its upper surface, comprising the column of liquid fuel contained within the tube 7. The diaphragm 15 may be of various materials, non-soluble in gasoline or other liquid fuel to be contained in the tank 1, and which may be of metal, preferably, in such case made very thin, such metal which is suitable, being known as "shim stock" for bearing shims, and may be made as thin as .002 of an inch thick.

Such a diaphragm is preferably reenforced by reenforcing discs 16 and 17 secured tightly to its two sides in its central portion, and the diaphragm may be annularly crimped, as indicated, in portions intermediate its reenforced central portion and its clamped peripheral portion. The ring 13 is securely held in clamped position by a plurality of spaced clamping screws 18 projected through openings in the border of the diaphragm through the upper wall of the cup element 3 and into screw threaded apertures of the ring 13. Any means of insuring that the joint between the casing 3 and the diaphragm 15, shall be proof against leakage of liquid fuel, may be employed, such as by soldering, the use of gaskets, or the like.

In the following description it will be understood that the contiguous surfaces of the diaphragm, clamping rings 13 and casing 3, are securely soldered together by first tinning the surfaces, and then reheating them while in contact, and after the screws 18 have been tightly driven home.

An apparatus supporting annulus 19 is rigidly secured to the ring 13 by screws 20 disposed at intervals around the ring and supports an apparatus supporting frame 21, a contact support 22, a circuit conductor insulating terminal 23, and a support 24 for a thermo-responsive warpable strip 25. The apparatus supporting frame 21, supports by a flange 26, an electromagnet 27, and by upturned ears 28, a pair of pivot screws 29, which in turn pivotally support a swivelable armature 30 for the electromagnet, which is integrally secured to a controlling tongue 31, extending across the casing and its free end 32 supporting an electrical contact 33 and a mechanical contact 34. The electrical contact 33 is adapted to engage a cooperating contact 35 carried on the end of a longitudinally adjustable contact screw 36, which in turn is supported on a plug 37, the electrically insulating material rigidly affixed by machine screws to an arm of the support 22.

A second longitudinally adjustable screw 37 has its end adapted for engagement by the free end 32 of the tongue 31 upon movement of the tongue in such a way as to break the electrical contacts 35—33. The mechanical contact 34 is adapted for engagement by a cooperating mechanical contact 38, carried on the free end of the thermally warpable bi-metallic strip 25, upon a predetermined warp of the strip 25, effected by a predetermined heating thereof.

Referring particularly to Figs. 5 and 6, I illustrate therein a spool 40 of copper or like metallic material, and containing heating winding 39 disposed between flange heads of the spool, the winding being of nichrome or other heat resistant electrical resistance wire, and of a number of suitable relatively electrically insulated convolutions. The riveting projection 88 is projected through a border of the strip 25 and is then headed over by rivets to make a secure mechanical connection between the spool 40 and strip 25 for the efficient conduction of heat therebetween.

As illustrated at 40, I may make this spool of various sizes, so as to operate with various degrees of efficiency to store heat communicated to it by the winding 39, the spool 40 and the strip 25 operating for a purpose later to be made clear, as a reservoir and radiator of heat communicated thereto by the winding.

In the operation of the mechanism later described, it is important that heat generated in the winding, shall be stored accumulatively to an appreciable extent, and my invention contemplates the storage of heat in the bi-metallic element comprising the strip 25 and spool 40, so that when electrical current flow through the winding 29 is interrupted for a period of seconds, that an undue cooling of the strip 25 in portions adjacent the projection 39, shall not be accomplished beyond a predetermined rate, even upon conditions of low atmospheric temperatures.

The thermally warpable strip 25 may comprise various materials, such as two superposed sheets of different steel and nickel-steel alloys, or superposed strips of steel and brass, and the like, and may be of various dimensions and may take various forms.

Thermally warpable bi-metallic sheets of metal are today commercially manufactured in widely varying thickness and can be cut to any desired lengths and widths. Commonly such strips are made of a relatively small thickness of "Invar" steel and a greater thickness of brass or the like. The two sheet strips are welded, brazed, or otherwise intimately secured together by their contiguous surfaces and are capable of being cut and formed as a single sheet of metal.

In the type of strip which I preferably employ and which is best illustrated in Figs. 1, 2, 4, 7 and 8, and which may be advantageously employed alike for controller and indicator of my improved gauge, the heating element 81 for the indicator and 82 for the controller, is in each case, mounted on and adapted to heat only one of a pair of longitudinally joined, oppositely disposed warpable strip elements, and which are preferably practically thermally insulated from each other. This arrangement is for the purpose of insuring that only one of the strips will be effectively electrically heated, whereas both will be exposed to the same prevailing temperatures of the surrounding air.

Fig. 7 shows the composite thermostatic strip having longitudinally aligned thermostatically warpable strip elements 71 and 72 rigidly joined together by a relatively heat insulating joint 73, held in place by rivets 74.

The strip 72 is inverted relative to the strip 71, so that upon increased atmospheric temperatures, to which the two strip elements are alike exposed, it will warp its free end 74 upwardly, as illustrated, while the free end of the strip 71, which carries the strip 72, will be moved downwardly.

The dimensions of the two oppositely warpable elements 71 and 72 are so chosen that when the composite strip is exposed to changes of atmospheric temperature, the two strip elements will warp oppositely to effect opposite moving effects on the contact carrying end 75 of the strip 72, and therefore the lever, engageable by the contact of the strip 72, will not be actuated upon mere changes of atmospheric temperature, to which the controller, such as shown at the bottom of Fig. 8, may be exposed.

Fig. 8 illustrates also the use of such a composite strip, as illustrated in Fig. 7, to operate an indicator 2 having an indicator hand 77, pivoted at 78, and engaged at a bifurcated end 79 of the free end 80 of the composite strip having longitudinally aligned joined strip elements 72' and 71', the element 71' of which, only, carries an electrical heating element 52, rigidly riveted to it, as best illustrated in Fig. 7, and after the manner illustrated in Fig. 6, except that in Fig. 8, the heating element 81 also is employed as a fixed support for the strip 71.

Such an arrangement is desirable to be employed wherever the controller and indicator of my improved indicating system, are so disposed that they will be exposed to different atmospheric temperatures.

Such a condition might prevail, for instance, where the controller is carried by the gasoline tank on the outside of a closed vehicle, whereas the indicator is carried on the inside of the vehicle, which is provided with means for heating the interior of the vehicle. On a cold wintry day it will be readily appreciated that there might sometimes be a difference of 50° Fahrenheit, or more, between the exterior and interior of the vehicle.

In Figs. 3 and 4 the above described thermally compensated strip is shown, with the associated heating element 40, with associated apparatus now to be described.

Either the supported or the supporting strip may be electrically heated to accomplish the purposes set forth therein of securing a composite strip operatively insensible to changes of atmospheric temperature, but adapted to move a portion of its length to effect the useful controlling and indicating functions as described.

For instance, in the embodiment of my invention illustrated in Figs. 3, 4, 7 and 8, the supporting strip 71 is electrically heated in addition to being exposed to atmospheric temperatures, whereas the supported strip comprising the free end of the strip, shown at 72, is exposed but to little of the electrically derived heat, but is, of course, exposed to atmospheric temperatures.

In such cases, the free end of the strip merely acts as an arm to communicate warping movements electrically effected by the supported end of the strip and to compensate such movements for variations in atmospheric temperatures.

However, the alternative arrangement may be employed as illustrated in Figs. 1 and 2, wherein the heating winding 39" and 39', respectively, is applied to the supported strip portion carrying the actuating mechanical contacts 38" and 38' respectively.

In such a case, the compensating portion 90 and 90' respectively, for each strip surface to shift the support for the electrically heated free end of the strip, according to the prevailing atmospheric temperatures to compensate therefor.

Figs. 1 and 2 illustrate also an alternative method of applying the heating winding to the strip, wherein the metallic spools such as shown at 40, Fig. 5, are dispensed with the winding applied preferably in a single layer to the bi-metallic strip. Either plan may be followed, although generally I prefer the use of the metallic heat storing spools 40, of predetermined mass.

Interposed between the tongue 31 and the reenforcing disks 17 of the diaphragm, I provide a link to communicate motion from the diaphragm to the tongue, said link comprising a bifurcated holder 41 and pointed pin 42 swivelably supported by its non-pointed end between the forks of the support 41, which is rigidly secured to the disk 17. The tongue 31 is suitably recessed on its surface disposed axially in line with the center of the diaphragm, the recess being preferably conical in form and having side walls flaring outwardly to a greater extent than the walls of the pointed end of the pin 42, so that the point of the pin may make a universal joint connection with the bottom end of the recess.

The recess 43 is disposed intermediate the free end of the tongue 31 and its swiveling axis, which includes the pivot screws 29 and the turned-up ears 44 of the integrally joined armature 30 and tongue 31. At the same time, however, the recess 43 is disposed very closely adjacent to such swiveling axis so that slight movements of the pin 42 communicated to the tongue 31, will effect multiplied movements of the free end of the tongue, and also by virtue of this multiplying leverage arrangement, pressure efforts communicated by the pin 42 may be overpowered by greatly reduced pressure efforts exerted at the free end of the tongue. Therefore, this arrangement permits overpowering of a considerable pressure effort exerted by the diaphragm through the pin on the tongue, by a relatively slight pressure effort accomplished by warping of the bimetallic element 25 upon heating it.

A lever relationship also exists between the effective force exerted upon the armature 30, electromagnetically effected by the pole of the electromagnet core 45, relative to the forces exerted upon the free end of the lever, as above noted, and for the purpose later made clear in the description of the operation of the device.

Referring more particularly to Fig. 1, I show therein a source of electrical current 46, an automotive vehicle ignition circuit switch 47, an indicator 2, shown more in detail in Fig. 8 and a primary ignition circuit conductor 48, current through which is controlled by the operation of the switch 47, together with a circuit conductor 49, which is joined to the ignition circuit conductor 48 and extends therefrom through the apparatus diagrammatically illustrated in Fig. 1, but more completely illustrated in Fig. 3. This apparatus comprises the multiply connected electromagnetic and heating energizing windings for the magnet 27 and thermally warpable strip 25, respectively, and the circuit thereof is continued through the controlling electrical contacts 33 and the latter supported by the adjustable screw 36, and lever tongue end 31, which is electrically connected to the frame of the automotive vehicle indicated diagrammatically at 51, joined to the opposite terminal of the source of current 46. This may be the usual storage battery now commonly used by automotive vehicles.

Interposed in the circuit conductor 49 and intermediate the switch 47 and the apparatus of Fig. 3, is the electrical indicator 2 such as that as shown in Fig. 8 which comprises a heating winding 52, in association with means for indicating the temperatures effected by intermittent flow of electrical current in the winding 52. Such indicating means are herein illustrated as a composite strip being a heat compensated strip having sections 71' and 72', the section 71, substantially above being heated by current through the winding 52, as before described.

The operation of the system of my invention will now be described, it being understood that liquid fuel, such as gasoline is supplied through a filling opening 55 of the tank 1, as indicated at 56, and to a level L, Fig. 1, this level being attained gradually within the tube 7 by communication of the liquid fuel from the tank 1 to the interior of the tube, through the apertures 8 in the lateral wall of the tube, at the bottom of the tank, and by the filling of the spaces 57 intermediate the partition discs 10 and 12 at the bottom of the tube, and the spaces 58 disposed intermediate the discs 12 and the diaphragm 15, flow between the different compartments being effected through the orifices 8, 11 and 14, as previously related.

The diaphragm 15 will tend to be pressed downwardly by the weight of the fluid disposed above and with a force depending on its area, and which pressure will be effectual to tend to move the central portion of the diaphragm with a force proportional to the weight of the column of liquid supported by the diaphragm.

The central portion of the diaphragm will communicate such pressure by the pin 42 to the recessed point 43 on the lever 31, which is adapted to swivel about an axis 28'. The free end of the lever tongue 31 will therefore be deflected downwardly against the contact 35 to close the energizing electrical circuit for the electromagnet 27 and the heating winding 39 for the thermally warpable strip 25, and which circuit was previously described. Also the heating winding 52 on the indicator 2 will conduct current flow to heat the bulb simultaneously with the periods of heating of the strip 25 by its winding 39.

As illustrated in Fig. 5, the heating of the strip 25 is capable of being effected by first heating a mass of metal contained in the metallic spool 40, and this is accomplished at a rate depending upon the amount of mass in the spool, the thermal properties of the metal, its exposed radiating surface, and the properties of metal in, and the radiating surface of, the contiguous portions of the strip 25. The similar spool 52 of the indicator actuating strip and its winding are preferably proportioned to heat and cool at the same or at somewhat less than the same rate as the heating and cooling of the warpable strip 25 is accomplished.

The spools 40 and 52 are preferably made of copper or brass and comprise a considerable amount of the metal so that heating of the entire mass will proceed accumulatively while current by increments of heat, is supplied by intermittent current impulses through the electrical resistance units 39 and 52, respectively, to heat them. The intermittent communication of heat increments to the spools 40 and 52 is communicated more continuously therefrom to their respective sections which will be continuously warped to a degree commensurable with the temperature of the spool 40, which by the mass of metal, retains heat stored therein between current impulses.

No necessity for compensation for differences of voltage of the source 46 need be provided and the system is adaptable for use over the entire range of atmospheric temperatures which may be experienced under conditions of low atmospheric temperatures, the heating elements 40 and 52 will automatically be continued to be energized for longer intervals than where the atmospheric temperatures are higher, but with the same ultimate effect.

Coincidental with the heating of the strip 25 and the thermometer bulb 54, the electromagnet 27 will be energized and will suddenly supplement the force exerted by the liquid supporting diaphragm 15 on the tongue 31, to press the electrical contacts 33 and 35 somewhat more tightly together to insure that a good contact is made, and to further provide for a subsequent "snap-action" breaking of these contacts. I contemplate herein other equivalent instrumentalities for achieving such "snap-action".

After an initial heating of electrically heated and of the warpable strip 25 has progressed long enough to cause the mechanical contact 38, carried by the end of the warpable strip, to engage the mechanical contact 34, further warping of the strip will communicate pressure to the tongue 31, accumulatively, for a short interval thereafter, the end of the strip 25 being temporarily restrained from movement responsive to pressure exerted by the bi-metallic strip, because of the pressure of the diaphragm exerted upon it, supplemented by the electromagnetic pull on the armature 30.

However, in a short period of time the warpable strip, restrained from taking its fully developed warped form by the resistance offered by the tongue as aforesaid, and resiliently deflected from such form by the opposing pressure developed by warping resisted by the magnet and diaphragm, will overcome the counter-pressure of magnet and diaphragm and move the tongue to "break" the contacts 33—35, which will suddenly effect deenergization of the magnet by breaking of the circuit of the magnet winding.

The sudden relief of the counter-pressure exerted by the magnet, will permit the strip to resiliently snap the tongue upwardly against the pressure of the diaphragm by the stored force resulting from its inherent resiliency, and the mechanical deflection from its fully warped form caused by the force exerted upon the tongue of the magnet.

Thus a snap break of the contacts is had with consequent reduction of arcing at the contacts.

Although my apparatus may be embodied in varying structures for different purposes, I find that for the usual gasoline tank, I may operate the machanism of the embodiment described, with a current strength not exceeding .5 of an ampere, and much lower current strengths may be employed successfully in connection therewith.

Upon breaking of the contacts 33—35, the current flowing through the heating elements 40 and 52, on the controller bimetallic strip and indicator strip, respectively, will be discontinued, and the strip and bulb will coincidentally progressively cool to a point where, due to weight of liquid 56 in the tank, the weight supported by the diaphragm will again overpower the supporting effort of the somewhat cooler strip 25, to close the contacts 33—35, whereupon the cycle just described will be repeated, comprising energization of the magnet 27 to more firmly close the contacts, an increase of heating of the strip 25, and of the indicator strip 72', and consequently overpowering of the magnet and diaphragm by the strip, and a consequent "snap-action" breaking of the contacts 33—35.

It is to be noted, however, that the first heating period subsequent to closure of the switch 47, takes a longer time to effect breaking of the contacts 33—35 than subsequent periods, wherein increments of heating are coincidentally supplied, to the strip 25 and bulb 54, periodically. Subsequent to the first heating period, the subsequent heating periods are of short duration, so short that the indicator hand does not waver to an objectionable amount, the variation being within the limits of error assigned to instruments of this kind and preferably scarcely noticeable.

Where extreme steadiness of indication is desired, this may be accomplished by increasing the heat storage capacity of the heated indicator element 52. This may be done in various ways, increasing the mass of the spool thereof; or enclosing the winding with a cover of thermal insulation, or both.

The heat storage capacity of the indicator heated parts is that which will permit the bulb to accumulate heat at a rate that will enable it to indicate the amount of gasoline in a filled tank 1, nearly as rapidly as the tank is filled at the gasoline supply station. This usually takes a period of at least a minute and the responsiveness of the indicator to heating current is proportioned accordingly; subsequent periods of heating are individually much shorter.

Referring now to the embodiment of my invention illustrated in Fig. 2, the apparatus is similarly organized, except that therein, the diaphragm 15' is adapted to be placed above the level of the tank 1', and supports a displacement element 61 secured to its lower surface, and which may preferably be a wood rod carrying a predetermined number of weights, such as lead shot 62, in a bottom recess. The weighting of the displacement element 61 is thereby preferably made such, relative to its displacement volume, that when the tank is full of liquid fuel, the rod 61 will still exert a slight predetermined downward pull on the center of the diaphragm 15', on account of its aggregate weight, exceeding its buoyancy.

In operation, the electrically heated end of the strip 25', by warping periodically, overcomes the force effected by weight of the displacement element plus a slight pull effected by the magnet, the length of the heating periods relatively to the cooling periods depending upon the amount of the weight, which in turn is determined by the relative part of its length not at the time immersed in the liquid fuel 56'. A tube 7', closed at its bottom end, except for minute lateral apertures 8', near its bottom, surrounds the displacement element, protects it, and during agitation of the tank by movement of the vehicle, prevents rapid changes of level influencing the weight of the displacement element.

It is to be noted that in this embodiment of my invention, a full tank will cause the displacement element to be of slight effective weight, and therefore little heating of the warpable strip 25' will be required to effect intermittent operation of the contacts, and, therefore, the band of the indicator 2' will indicate, by a slight movement from normal position, a relatively large amount of gasoline; when the tank is empty or nearly empty, more heat will be required to effect warping of the strip 25' sufficiently to overcome the full weight of the displacement element 61, and so the controlling contacts will be maintained closed for longer periods relative to their periods of opening, and consequently the indicator heating element will be heated for longer periods and will retain more accumulated heat to cause the indicator band to be moved to a position much more remote from its normal position.

Therefore, an indication responsive to a relatively greater heating of the indicator strip will indicate greater depletion of the fuel supply. The indications in the indicator for the controlling apparatus of Figs. 3 and 4, are just the reverse of that illustrated in Fig. 2, since in the embodiment of Figs. 1, 3 and 4, a slight movement of the indicator band indicates a relatively small amount of gasoline in the tank.

The actuating element 61 differs from actuating floats of the types generally employed in other forms of liquid level ascertaining devices, which floats are buoyant and operate in various objectionable manners on account of their buoyancy.

In the embodiment of my invention illustrated, although the drawings, are not relatively to scale, I preferably proportion the parts of the indicator and the parts of the switch operating mechanism for heat storage capacity and for dissipation of heat, so that both electrically heated units at the controller and at the indicator will heat and cool in unison and at the same rates.

In this way I prevent overthrow of the indicator needle when the manually operated switch 47, Fig. 1, is first closed, and avoid gradual changes of reading by a creeping action at the indicator as is otherwise apt to occur where these proportions are departed from, variously. In this embodiment, the heating curves of the thermostats at the controller and at the indicator are substantially alike in form.

The diaphragm is carried on a flanged cup 3' having an annular exteriorly threaded hollow stem 4' screw threaded into an interiorly threaded hollow boss 5' of the top wall of the tank 1. A link, such as a piece of very fine wire 42', inter-connects the reenforced central portion of the diaphragm with the lever tongue 31', swivelable about an axis 29'. The lever comprises a lever arm 30' forming an armature for an electromagnet 27', a second arm or tongue 31', carrying at its free ends a mechanical contact 34' engageable with a similar contact 38' carried on the free ends of the bi-metallic strip 25' fixedly mounted on the compensating strip 90 at 24'.

The strip is adapted to warp its free end upwardly when heated by the supported heating element 39'. The free ends of the tongue also carries, by a preferably flexible expansion 62, an electrical contact 33' engageable with an adjustable contact 35', when the free ends of the tongue 31' is moved downwardly by the overpowering effect of the weight of the displacement element 61', the electromagnetic pull of the magnet 27' on the armature 30', or both.

The operation of the device will be now understood, the circuit connections being preferably the same as illustrated in Fig. 1, and comprising a circuit conductor 49' interconnecting the controller at the tank with the heating element of the indicator 2', which though not shown may be constructed in the manner of that shown in Fig. 8, as described, the strip being, however, preferably reversed and the hand therefore made movable from right to left, preferably upon increased electrical heating of the heating element.

The above embodiments are chosen for illustration of two different ways of operating fluid level indicating systems in accordance, broadly, with the principles of my invention, and I am aware that numerous and extensive departures may be had from the embodiments herein illustrated and described but without departing from the spirit of my invention.

I claim:

1. In an electrical controller for transmitting impulses in accordance with a variable pressure, a switch comprising contacts and an oscillatably mounted switch arm, variable pressure producing means for applying switch closing pressure yieldably at a point adjacent the axis of oscillation of the switch arm, a thermostat adapted to exert thermally effected force on the switch arm in the switch opening direction at a point remote from the oscillation pivot, a source of current, an electrical heating element for heating said thermostat, electrical circuit conductors interconnecting said switch contacts and said source of current with said heating element, whereby said switch under the joint control of said pressure producing means and said thermostat is operated periodically to close responsive to pressure and open responsive to heating of the thermostat to periodically electrically energize said heating element, and an electro-magnet energizable by current from said source through the switch contacts when closed and disposed to exert a yieldable force on the switch arm at a point adjacent the pivot of oscillation and in the direction to assist the pressure producing means to yieldingly hold the switch closed and adapted to effect a snap-action release of the switch arm when opened by the thermostat.

2. In an electrical impulse transmitting system, a switch comprising an oscillatable arm and contacts, a variable pressure means for applying switch closing pressure, an electromagnet cooperating with said variable pressure means to maintain the contacts closed when energized, a thermostat adapted to exert thermally effected switch opening force when the contacts are closed, an electrical heating element for heating said thermostat, electrical circuit connectors interconnecting a current source, said switch contacts, said electromagnet, and said heating element, whereby said switch contacts are closed responsive only to the variable pressure means, are conjointly maintained closed by the said pressure means and the electromagnet, and are opened responsive only to the force of said thermostat, the electromagnetic restraining force being nullified abruptly upon opening of the contacts to effect a snap-action movement therebetween.

3. In an electrical controller for transmitting impulses in accordance with a variable pressure, a switch comprising contacts and an oscillatably mounted switch arm, variable pressure producing means for applying switch closing pressure yieldably to the switch arm, a thermostat adapted to exert thermally effected force on the switch arm in the switch-opening direction, a source of current, an electrical heating element for said thermostat, electrical circuit conductors interconnecting said switch contacts and said source of current with said heating element, whereby said switch under the joint control of said pressure producing means and of said thermostat is operated periodically to close responsive to pressure and open responsive to heating of the thermostat to periodically electrically energize said heating element, and an electromagnet energizable by current from said source through the switch contacts when closed and disposed to exert a yieldable force on the switch arm in the direction to assist the pressure producing means to yieldingly hold the switch closed and adapted to effect a snap-action release of the switch arm when opened by the thermostat.

4. An electric controller as described in claim 1 and in which the switch comprises a stationary contact and a contact on the switch arm and the stationary contact acts as a stop to limit switch arm oscillatory movement in the contact-closing direction and a second stop is provided to limit magnet-effect snap-action movement in the other direction.

5. An electrical indicating system as described in claim 1 and wherein heat storage means is movingly associated with the thermostat and in thermal contact therewith whereby undue cooling of the thermostat will not be effected by ambient temperature upon opening of the switch contacts and switch opening action will be delayed to effect a snap-action release of the switch arm.

FRANK M. SLOUGH.